(12) United States Patent
Beaulieu

(10) Patent No.: US 6,950,870 B2
(45) Date of Patent: Sep. 27, 2005

(54) METHOD AND APPARATUS FOR LOOP DETECTION AND DISSOLUTION IN A COMMUNICATION NETWORK

(75) Inventor: Denis Beaulieu, Lachine (CA)

(73) Assignee: Harris Corporation, Melbourne, FL (US)

( * ) Notice: Subject to any disclaimer, the term of this patent is extended or adjusted under 35 U.S.C. 154(b) by 757 days.

(21) Appl. No.: 10/066,647

(22) Filed: Feb. 6, 2002

(65) Prior Publication Data

US 2003/0149764 A1 Aug. 7, 2003

(51) Int. Cl.[7] .................. G06F 15/173; G06F 15/16
(52) U.S. Cl. ................ 709/224; 709/205; 709/223; 370/255; 370/401
(58) Field of Search .................. 709/224, 201–203, 709/204–207, 223–226; 370/254–258, 216–228

(56) References Cited

U.S. PATENT DOCUMENTS

| | | | |
|---|---|---|---|
| 5,034,945 A | | 7/1991 | Kimoto et al. |
| 5,101,348 A | * | 3/1992 | Arrowood et al. ......... 709/242 |
| 5,321,812 A | | 6/1994 | Benedict et al. |
| 5,371,732 A | * | 12/1994 | Brocken et al. ............ 370/217 |
| 5,583,991 A | * | 12/1996 | Chatwani et al. .......... 709/223 |
| 5,710,885 A | | 1/1998 | Bondi |
| 5,732,086 A | | 3/1998 | Liang et al. |
| 5,784,557 A | | 7/1998 | Oprescu |
| 5,862,129 A | | 1/1999 | Bell et al. |
| 5,870,386 A | | 2/1999 | Perlman et al. |
| 5,881,243 A | * | 3/1999 | Zaumen et al. ............ 709/241 |
| 6,038,600 A | | 3/2000 | Faulk, Jr. et al. |
| 6,041,049 A | | 3/2000 | Brady |
| 6,081,511 A | | 6/2000 | Carr et al. |
| 6,202,114 B1 | | 3/2001 | Dutt et al. |
| 6,205,122 B1 | | 3/2001 | Sharon et al. |
| 6,360,260 B1 | | 3/2002 | Compliment et al. |
| 6,857,027 B1 | * | 2/2005 | Lindeborg et al. ......... 709/239 |
| 2002/0120837 A1 | * | 8/2002 | Maxemchuk et al. ....... 713/153 |

FOREIGN PATENT DOCUMENTS

| | | | | |
|---|---|---|---|---|
| EP | 0555926 A1 | * | 8/1993 | ........... H04L/12/56 |
| WO | WO 00/75962 | | 12/2000 | |

OTHER PUBLICATIONS

Forwarding without loops in IcarusWhitaker, A.; Wetherall, D.; Open Architectures and Network Programming Proceedings, 2002 IEEE, vol., Iss. 2002; pp.: 63–75.*
Distributed routing algorithm for loop detection and resolution; Park, S.–W., Tsai, W.K. Military Communications Conference, 1991. MILCOM '91, Conference Record, 'Military Communications in a Changing World'., IEEE, vol., Iss., Nov. 4–7, 1991; pp.: 6–10.*

* cited by examiner

*Primary Examiner*—Krisna Lim
*Assistant Examiner*—Philip S. Scuderi
(74) *Attorney, Agent, or Firm*—Duane Morris LLP

(57) ABSTRACT

A method of loop detection and dissolution in a communication network including a plurality of nodes, the method comprising: (a) detecting a change in topology of the network by at least one of the plurality of nodes; (b) sending a vote token from the detecting node to each neighbor node, said vote token including an address of the detecting node and number of neighbor nodes of the detecting node; (c) receiving the vote token from the sending node at each of the neighbor nodes from the sending node and: (c1) forwarding the received vote token to all neighbor nodes, if the receiving node has the same or less neighbor nodes then the sending node, and (c2) sending a new vote token to all neighbor nodes if the receiving node has more neighbor nodes then the sending node, the new vote token including the address of the receiving node and number of neighbor nodes of the receiving node; (d) repeating step (c1) and (c2) by each node to which a vote token is either sent or forwarded until one of the nodes receives a token which that node sent and thereby becomes the elected loop-checker node; thereupon a loop-check token is sent by an elected loop-checker to determine which of the ports to "mute" to open the loop.

15 Claims, 5 Drawing Sheets

METHOD AND APPARATUS FOR LOOP DETECTION AND DISSOLUTION IN A COMMUNICATION NETWORK

BACKGROUND OF THE INVENTION

The present invention relates to a method of loop detection and dissolution in a communication network including a plurality of nodes or network elements. More specifically, the present invention relates to an arboreal routing scheme for delivering communications to all nodes in the system without creating a loop.

Certain communication systems include a voice party line on every network element or node located within a plural node communication system. The voice of each participant in the party line is sampled and put in packets. These voice packets are distributed from the originating nodes to the nodes that are directly or indirectly connected to the originating node. At each node, the voice packet received from the each of the directly connected nodes is summed with the voice packets from all other nodes. This process is sometimes referred to as processing the "digital bridge".

Voice packets are not sent back on the same port on which the voice packets have been received to avoid an echo effect. However, under certain conditions a loop forms within the network topology. When there is a loop within the network, a voice sample will be summed with itself repeatedly. The present invention provides a method of detecting and eliminating a loop which has formed within the network.

In addition, the present invention provides an arboreal routing protocol which detects the presence of a loop in the communication network and eliminates the detected loop without damaging the integrity of the communication of the nodes within in the network. Moreover, the arboreal routing protocol of the present invention requires little computing power from the network elements and converges very rapidly to a solution.

BRIEF DESCRIPTION OF THE DRAWINGS

The exemplary embodiments of the present invention will be described with reference to the accompanying drawings.

DETAILED DESCRIPTION OF THE PREFERRED EMBODIMENT

Figure 1:
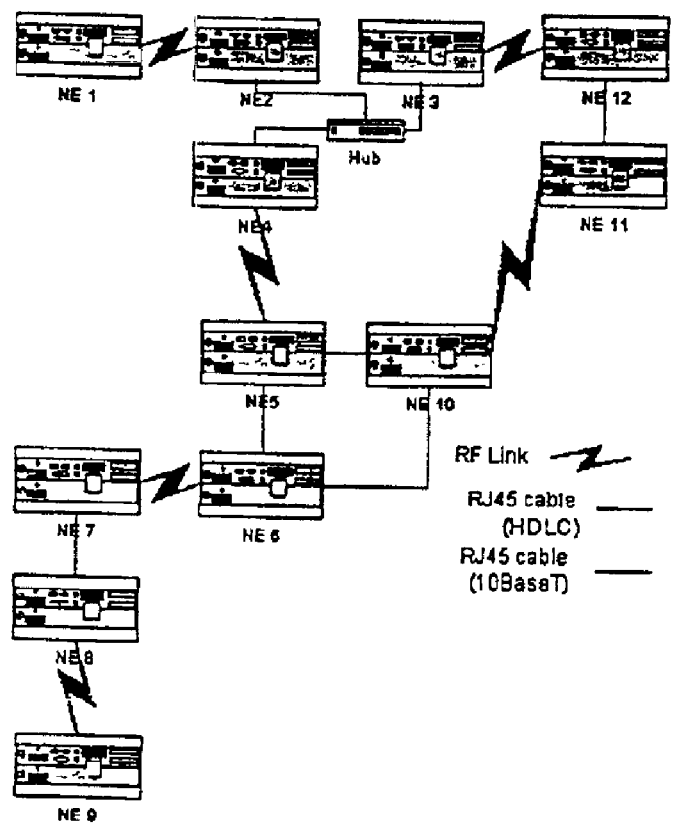
FIG. 1 is a schematic drawing of a plural node communications network showing the arboreal routing for a message originating at NE1.

FIG. 1 illustrates an exemplary embodiment of an arboreal routing for a broadcast frame originating at node NE1. Each of the plurality of nodes NE1–NE12 are linked through ports to at least one neighbor node and indirectly linked through a neighbor node to at least one remote node.

A neighbor node which is directly connected and in communication with another node is referred to as a "Fully Qualified Neighbor" (FQN). However, if two nodes are connected to one another, but the communication is unidirectional between the two nodes, then these nodes would not be considered FQN. Different nodes within the system may each have a different number of FQNs.

Figure 2:
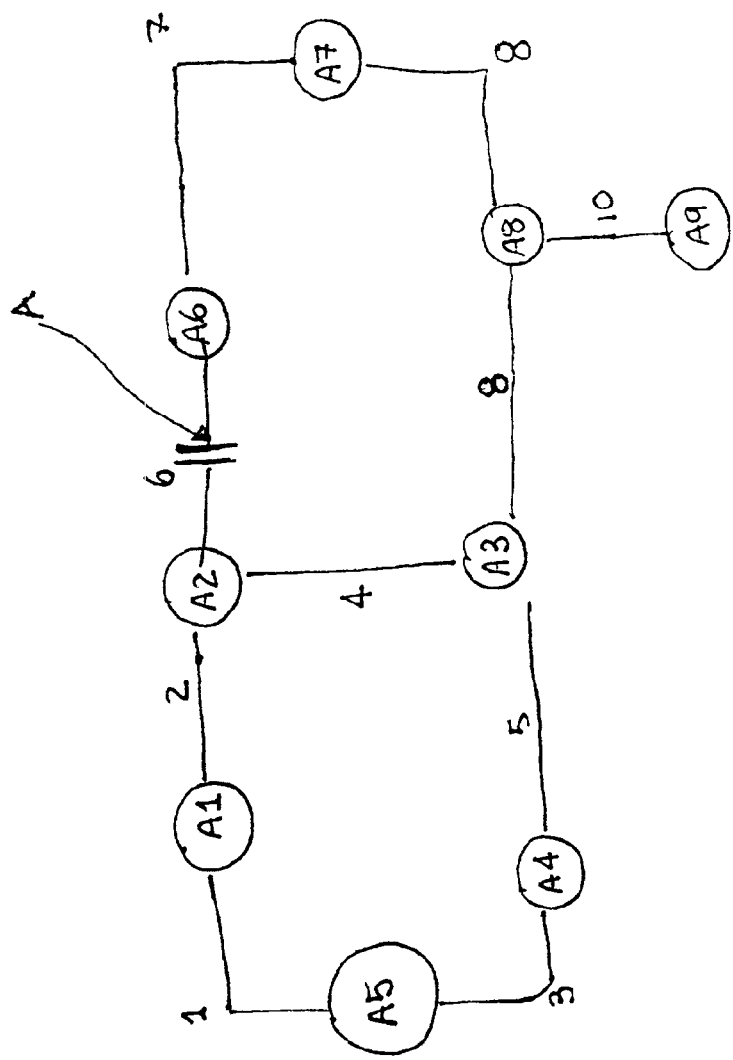
FIG. 2 is a schematic drawing of a communications network illustrating an exemplary arboreal routing during the voting state.

FIG. 2 schematically illustrates an exemplary embodiment wherein a plurality of nodes A1 through A9 are connected to one another through various ports 1–10. For example, in FIG. 2a, node A1 has two FQNs, i.e. nodes A5 and A2, and node A2 has three FQNs, i.e. nodes A1, A3 and A6.

When a change in topology of the network is detected or an external event occurs within the network, then at least one of the nodes in the network sends a vote token to each of its FQNs. Assuming a node detects a change in the topology of the network, then that node will send a vote token to its FQNs. The vote token contains the address of the node from which the token originated and the number of FQNs of the originating node.

If the node that sent the vote token does not receive it back within a predetermined time, preferably one second, it will un-mute all of its links and send a new set of vote tokens. This procedure is intended to avoid the isolation of any node.

Each node receiving the vote token from the originating node will compare the number of its FQNs with the number of FQNs of the originating node recorded on the received vote token. If the receiving node has the same or less FQNs than the originating node, the receiving node forwards the received vote token to all of the receiving node's FQNs, with the exception of the node from which the token was received.

If the receiving node has more FQNs then the originating node, then the receiving node "swallows" the token from the originating node and sends a new vote token to all of its FQNs with the exception of the node from which the swallowed token was received. The new vote token includes the identification and number of FQNs of the node by which originated.

This procedure is repeated at each node in the communication system until at least one of the nodes receives a vote token which that node had originated. Therefore, more than one node may be elected as the loop checker in a network.

The return of a vote token to its originator indicates that there is a loop within the network. Furthermore, the network determines which node within the loop as the highest number of FQNs, and may therefore have one of its ports "muted" without isolating that node from the other nodes in the network.

The originating node which receives the returned vote token becomes the elected-loop checker. It should be noted more than one node may become an elected-loop checker. In the exemplary embodiment, it is preferred that only one node at a time be performing the loop check. There are two mechanism which that insure that only one elected loop checker checks for loops at the same time. One mechanism being that each elected-loop checker performs a random delay so that the loop check tokens are sent at different times. Second, if a loop-checker node receives a loop-check token from another loop-checker node, it does not retransmit the token and the loop-checker node stops checking for loops. After a random delay, the loop-checker node transmits new loop-check tokens.

In the exemplary embodiment, the elected-loop checker randomly delays sending out the loop-check token. The random delay can vary in time, but in a preferred embodiment the random delay is anywhere from 1 second to 20 seconds. During the random delay, if the elected-loop check node receives a loop-check token from of another node, the elected loop check node will forward up to two loop-check tokens. If more than two loop-check tokens are received from the same node, the node will swallow these loop-check tokens. The reason for not allowing all loop-check tokens of other nodes to be forwarded during the random delay is the probability that these loop-check token(s) originated from another closed loop within the network.

Once the random delay is finished, the elected-loop check node sends a loop-check token to each of its non-muted links which are linked to a FQN. The loop-check token identifies the elected loop-check node and the port through which it was sent. Each of the FQNs that receive the loop-check token forward the loop-check token to their respective FQNs, with the exception of the node from which the loop-check token was received. This process continues until the loop-check token returns back to the elected loop-checker node through a port other then the port through which it was sent.

The elected loop-check node will not retransmit vote tokens or loop check tokens during non-random delay periods to insure that only one node in each loop should be in the loop-checking state. If more than one node in each loop is in a loop-checking state then there is a chance that two ports are being muted simultaneously or nearly simultaneously, therefore isolating certain nodes or network elements from the other members within the network.

Once a loop-check token has returned to the elected loop-checker node from which the token originated, the port which delivered the loop-check token back to the elected loop-checker node is then "muted", opening the loop, and the other ports of the elected loop-checker node are "unmuted".

By way of example and referring to FIG. 2, it is assumed that node A1 detects a change in topology of its neighbors. Upon detecting a change in the topology, node A1 sends a vote token containing its node name and the number of FQNs, i.e. 2. In this example, the name of the token will be V.A1.2. The V.A1.2 token is sent by link 1 and 2. V.A1.2 token sent through link 2 reaches node A2 which has three FQNs. Because node A2 has more FQNs than node A1, node A2 swallows V.A1.2 token.

A2 then sends a new vote token V.A2.3 through links 4 and 6. It does not send the new vote token through link 2 because link sent the swallowed vote token. V.A2.3 token will contain the node name and number of FQNs for node A2. It should be noted, that in the exemplary embodiment, the vote tokens are allowed to pass through muted links. V.A2.3 token sent through link 6 will travel the following path: A6, A7, and A8. Node A9 will receive a copy of the vote token, V.A2.3, which node A9 will swallow due to fact that there are no other neighbors for node A9 to forward the token. Node A3 will duplicate the V.A2.3, and send one of the copies back to node A2.

Upon receiving its won vote token, A2 is elected as a loop checker.

Vote token V.A1.2 that is sent through link 1 travels the following path: node A5, A4 and A3, respectively. Because node A3 has 3 FQNs and node A1 has 2, node A3 swallows the copy of the V.A1.2 token and sends a new vote token, V.A3.3 through links 4 and 8. Eventually, up to 4 copies of V.A3.3 token return to node A3 electing it as a loop checker.

At the end of the voting phase we have A2 and A3 elected as the loop checkers.

After a random delay, the elected loop checker A2 sends two loop check tokens which contain the node name and the address of the port which they were sent. In an exemplary embodiment, the random delay is about 1 to 20 seconds. In this example, we will name the loop check token sent by node A2 through port 2 as C.A2.2 token, and the loop check token sent by node A2 through port 4 as C.A2.4. It should be noted that in this exemplary embodiment, unlike the vote tokens, loop check tokens cannot pass through ports which are muted, e.g. link 6. Otherwise, the loop check tokens will travel through in the network.

Figure 3:
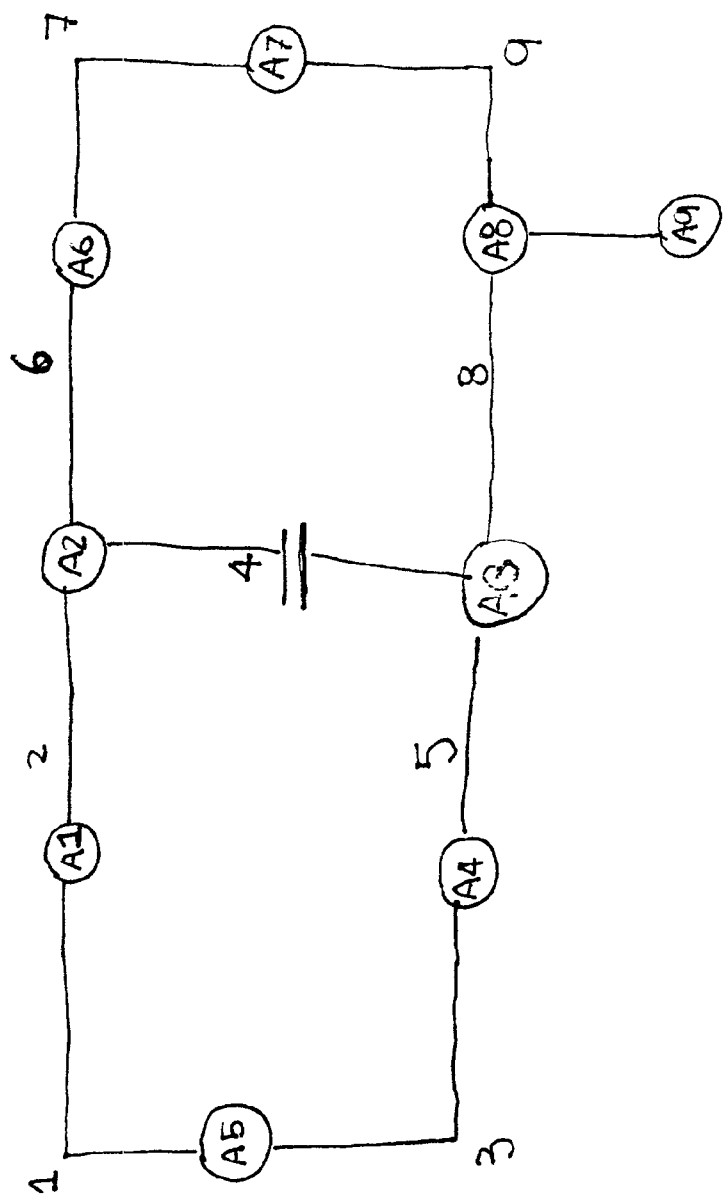
FIGS. 3 and 4 are schematic drawings of a communications network illustrating an exemplary arboreal routing during the elected loop-checking state.

As shown in FIG. 3, assuming that C.A2.2 returns back to node A2 by port 4 before the other token arrives to A2, then node A2 will unmute all its links and then mute link 4. Once this process is finished A2 is no longer a loop checker and it will pass the C.A2.4 token to its new unmuted links. Because link 4 is now muted, C.A2.4 will not pass through link 4 and will be swallowed the second time it reaches either the A2 node or the A3 node.

Figure 4:
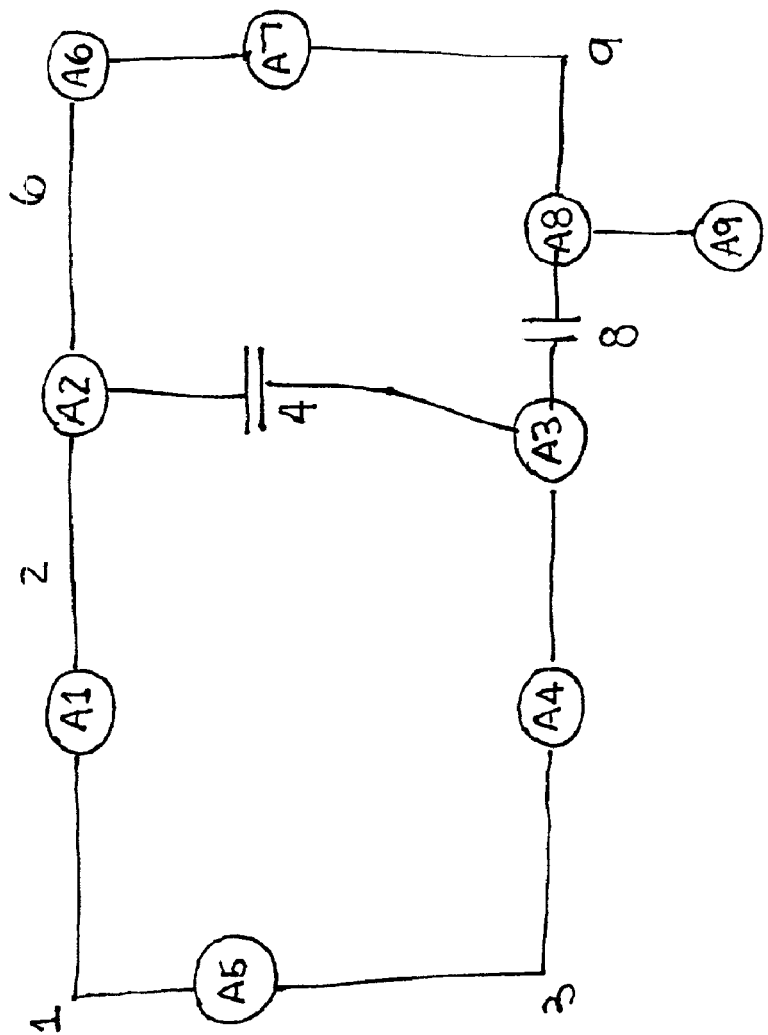

A3 is then the only remaining loop checker node. After a random delay, node A3 sends two loop check tokens that contain the node name and the address of the port by which the token was sent. In this example, the loop check token sent by port 5 is C.A3.5 and the loop check token sent by port 8 is C.A3.8. As shown in FIG. 4, if C.A3.5 returns to node A3 through link 8, then node A3 will un-mute all its links and then mute link 8. If C.A3.8 token returns to node A3 through link 5, then node A3 will un-mute all its links and then mute link 5. Once this is done, node A3 is no longer a loop checker and the network topology does not contain a loop.

Figure 5A:
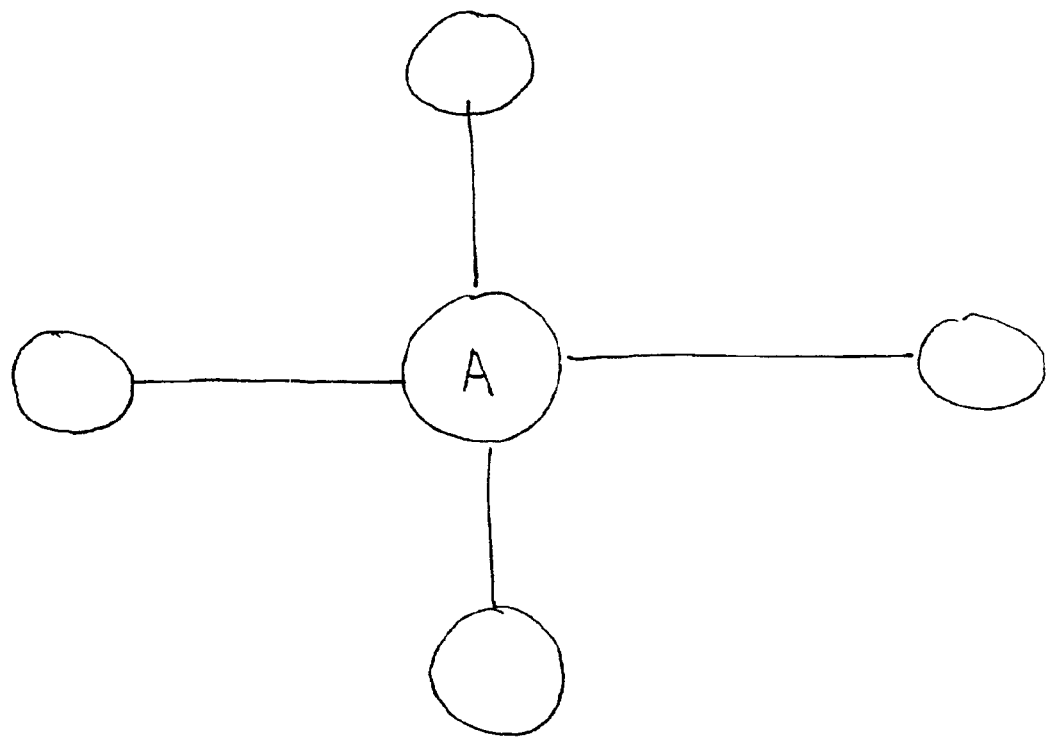
FIGS. 5a and 5b are schematic drawings of the network performing a topological transformation on a node having more than three links.
Figure 5B:
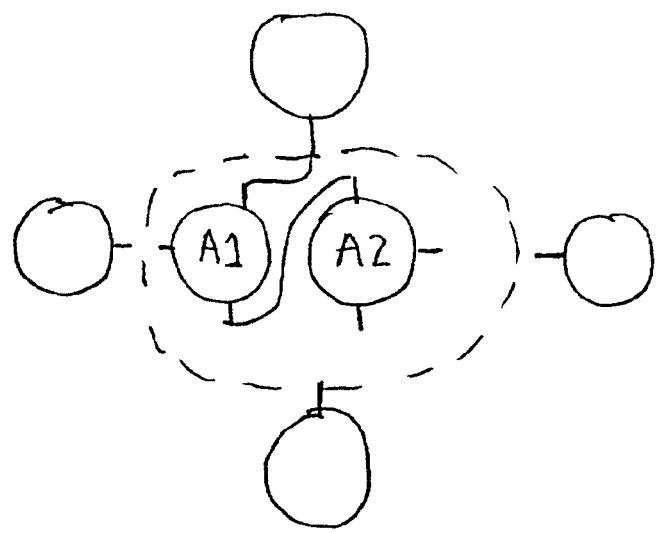

In another exemplary embodiment as shown in FIGS. 5a and 5b, some of the nodes may have more than three links. It is preferred for the algorithm to function properly that each of the nodes have at the most three links. When a node in the network has more than three links, the present invention performs a topological transformation. For example, FIG. 5a illustrates that node A has four links. In an exemplary embodiment, the present invention performs a topological transformation to make the node A which has four links appear as a two nodes have three links each as shown in FIG. 5b.

It may thus be seen from the foregoing that the above apparatus and method provide for an arboreal routing protocol that uses the most efficient route to send a broadcast frame. Because there are no loops, each frame is received only once by every node within the network.

Although the present invention and its advantages have been described in detail, it should be understood that various changes, substitutions and alterations can be made herein departing from the spirit and scope of the invention as defined by the appended claims.

What is claimed is:

1. A method of loop detection and dissolution in a communication network including a plurality of nodes, each of the plurality of nodes being directly linked through ports to at least one neighbor node and indirectly linked through a neighbor node to at least one remote node, the method comprising:
   (a) detecting a change in topology of the network by at least one of the plurality of nodes;
   (b) sending a vote token from the detecting node to each neighbor node, said vote token including an address of the detecting node and number of neighbor nodes of the detecting node;
   (c) receiving the vote token from the sending node at each of the neighbor nodes from the sending node and:
      (1) forwarding the received vote token to all neighbor nodes with exception of the sending node, if the receiving node has the same or less neighbor nodes then the sending node, and (2) sending a new vote token to all neighbor nodes with the exception of the sending node if the receiving node has more neighbor nodes then the sending node, the new vote token including the address of the receiving node and number of neighbor nodes of the receiving node;

(d) repeating step (c1) and (c2) by each node to which a vote token is either sent or forwarded until one of the nodes receives a token which that node sent and thereby becomes the elected loop-checker node;

(e) sending a loop-check token from the elected loop-checker node to each of the neighbor nodes, said loop check token including an address of the loop-checker node and identification of the port from which the loop-check token was sent;

(f) receiving the loop-check token at each of the neighbor nodes and forwarding the loop-check token to each neighbor node through a port that is different than the port identified in the loop-check token; and (g) muting any port of the loop-checker node on which the loop-check token is received.

2. The method according to claim 1, further comprising randomly delaying the loop-check token from being sent.

3. The method according to claim 1, wherein a random delay is between 1 to 20 seconds.

4. The method according to claim 2, wherein during the random delay the elected-loop check node continues to forward loop-check token(s) received from other nodes.

5. The method according to claim 1, wherein once a node is elected as the loop-checker node, the node does not send or forward either (a) tokens received from a node having fewer neighbors than the loop-checker node or (b) loop check tokens received from other nodes.

6. A method of loop detection in a communication network including a plurality of nodes, each of the plurality of nodes being directly linked through ports to at least one neighbor node and indirectly linked through a neighbor node to at least one remote node, the method comprising:

(a) detecting a change in topology of the network by at least one of the plurality of nodes;

(b) sending a vote token from the detecting node to each neighbor node, said vote token including an address of the detecting node and number of neighbor nodes of the detecting node;

(c) receiving the vote token from the sending node at each of the neighbor nodes from the sending node and:

(1) forwarding the received vote token to all neighbor nodes with the exception of the sending node, if the receiving node has the same or less neighbor nodes then the sending node, and (2) sending a new vote token to all neighbor nodes if the receiving node has more neighbor nodes with the exception of the sending node, then the sending node, the new vote token including the address of the receiving node and number of neighbor nodes of the receiving node;

(d) repeating step (c1) and (c2) by each node to which a vote token is either sent or forwarded until one of the nodes receives a token which that node sent and thereby the network has detected an occurrence of a loop within the network.

7. A method of loop detection and dissolution in a communication network having a topology which includes a plurality of nodes, each of the plurality of nodes being directly linked through ports to at least one neighbor node and indirectly linked through a neighbor node to at least one remote node, the method comprising the steps of:

(a) detecting a change in the topology or an external event;

(b) sending a vote token to all fully qualifies neighbors of the node detecting the change in topology or external event;

(c) receiving a vote token;

(d) forwarding the vote token if the receiving node has the same or less fully qualified neighbors;

(e) sending a new vote token if the receiving node has more fully qualified neighbors; and (f) detecting a loop once a vote token has returned back to originating node.

8. The method according to claim 7, further comprising sending loop-check tokens to all fully qualified neighbors from the originating node.

9. The method according to claim 8, wherein the loop-check tokens include the address of the originating node and a port by which the loop-check token is sent.

10. The method according to claim 9, further comprising receiving the loop-check token at each of the neighbor nodes and forwarding the loop-check token to each neighbor node through a port that is different than the port identified in the loop-check token.

11. The method according to claim 10, further comprising muting any port of the loop-checker node on which the loop-check token is received.

12. An apparatus for loop detection and dissolution in a communication network including a plurality of nodes, each of the plurality of nodes being directly linked through ports to at least one neighbor node and indirectly linked through a neighbor node to at least one remote node, the apparatus comprising:

(a) means for detecting a change in topology of the network by at least one of the plurality of nodes;

(b) means for sending a vote token from the detecting node to each neighbor node, said vote token including an address of the detecting node and number of neighbor nodes of the detecting node;

(c) means for receiving the vote token from the sending node at each of the neighbor nodes from the sending node and:

(1) means for forwarding the received vote token to all neighbor nodes with the exception of the sending node, if the receiving node has the same or less neighbor nodes then the sending node, and (2) means for sending a new vote token to all neighbor nodes if the receiving node has more neighbor nodes with the exception of the sending node then the sending node, the new vote token including the address of the receiving node and number of neighbor nodes of the receiving node;

(d) means for repeating step (c) by each node to which a vote token is either sent or forwarded until one of the nodes receives a token which that node sent and thereby becomes the elected loop-checker node;

(e) means for sending a loop-check token from the elected loop-checker node to each of the neighbor nodes, said loop check token including an address of the loop-checker node and identification of the port from which the loop-check token was sent;

(f) means for receiving the loop-check token at each of the neighbor nodes and forwarding the loop-check token to each neighbor node through a port that is different than the port identified in the loop-check token; and (g) means for muting any port of the loop-checker node on which the loop-check token is received.

13. The method according to claim 12, wherein the loop-check tokens are not able to pass through a muted port.

14. The method according to claim 12, wherein a node having four or more ports is topologically transformed to two or more nodes having at most three ports.

15. The method according to claim 12, wherein only one loop-checker node is checking for a loop at the same time.

* * * * *